United States Patent
Oh et al.

(10) Patent No.: US 8,778,447 B2
(45) Date of Patent: Jul. 15, 2014

(54) HYBRID COMPOSITIONS CONTAINING ORGANIC MATERIAL AND INORGANIC MATERIAL, AND HYBRID DIELECTRIC LAYERS INCLUDING THE SAME

(75) Inventors: Jiyoung Oh, Daejeon (KR); SangChul Lim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 92 days.

(21) Appl. No.: 13/402,901

(22) Filed: Feb. 23, 2012

(65) Prior Publication Data
US 2012/0231153 A1 Sep. 13, 2012

(30) Foreign Application Priority Data
Mar. 9, 2011 (KR) ........................ 10-2011-0020915

(51) Int. Cl.
| | |
|---|---|
| C08K 3/26 | (2006.01) |
| C08L 29/02 | (2006.01) |
| C09D 129/02 | (2006.01) |
| H01B 3/44 | (2006.01) |
| C08K 3/00 | (2006.01) |
| C08L 25/16 | (2006.01) |

(52) U.S. Cl.
CPC ............ C09D 129/02 (2013.01); C08K 3/0083 (2013.01); C08L 25/16 (2013.01)
USPC ............. 427/58; 524/400; 524/423; 524/428; 524/425; 524/399; 524/437; 524/80

(58) Field of Classification Search
USPC ............ 524/400, 423, 428, 425, 399, 437, 80
See application file for complete search history.

(56) References Cited

U.S. PATENT DOCUMENTS

| | | | | |
|---|---|---|---|---|
| 5,284,930 | A | * | 2/1994 | Matsumoto et al. ........... 528/482 |
| 5,929,204 | A | * | 7/1999 | Noguchi et al. ............... 528/482 |
| 5,993,567 | A | * | 11/1999 | Dolan ............................ 148/247 |
| 6,806,542 | B1 | * | 10/2004 | Zhang et al. ................... 257/411 |
| 2002/0015894 | A1 | * | 2/2002 | Wariishi et al. ............... 429/314 |
| 2003/0219640 | A1 | * | 11/2003 | Nam et al. ....................... 429/33 |
| 2006/0284171 | A1 | * | 12/2006 | Levy et al. ...................... 257/43 |
| 2007/0048477 | A1 | * | 3/2007 | Oh .............................. 428/36.92 |

(Continued)

FOREIGN PATENT DOCUMENTS

| | | |
|---|---|---|
| KR | 10-0428643 B1 | 4/2004 |
| KR | 10-2008-0049414 A | 6/2008 |
| KR | 10-2010-0013163 A | 2/2010 |
| KR | 10-0977406 B1 | 8/2010 |

*Primary Examiner* — Michael Pepitone
*Assistant Examiner* — Michael A Salvitti
(74) *Attorney, Agent, or Firm* — Rabin & Berdo, P.C.

(57) ABSTRACT

A hybrid composition includes poly-4-vinylphenol; a sodium compound; an aluminum compound; and a cross-linking agent effective to accelerate a cross-linking reaction of the ploy-4-vinylphenol, wherein, based on total weight of the poly-4-vinylphenol, the sodium compound and the aluminum compound, content of the poly-4-vinylphenol is 69 wt % to 99.89 wt %, content of the sodium compound is 0.01 wt % to 1 wt %, and content of the aluminum compound is 0.1 wt % to 30 wt %, and wherein content of the cross-linking agent ranges from 10 wt % to 30 wt % in an organic composition including the poly-4-vinylphenol and the cross-linking agent. A hybrid insulation layer that is dielectric and includes cross-linked poly-4-vinyl phenol is provided from the foregoing hybrid organic-inorganic composition.

10 Claims, 6 Drawing Sheets

(56) References Cited

U.S. PATENT DOCUMENTS

| | | | |
|---|---|---|---|
| 2007/0258147 A1* | 11/2007 | Van Der Boom et al. | 359/599 |
| 2010/0009267 A1* | 1/2010 | Chase et al. | 429/320 |
| 2010/0143826 A1* | 6/2010 | Schechner et al. | 429/527 |
| 2010/0144088 A1* | 6/2010 | Oh et al. | 438/104 |
| 2012/0231153 A1* | 9/2012 | Oh et al. | 427/58 |

* cited by examiner

HYBRID COMPOSITIONS CONTAINING ORGANIC MATERIAL AND INORGANIC MATERIAL, AND HYBRID DIELECTRIC LAYERS INCLUDING THE SAME

CROSS-REFERENCE TO RELATED APPLICATIONS

This U.S. non-provisional patent application claims priority under 35 U.S.C. §119 to Korean Patent Application No. 10-2011-0020915, filed on Mar. 9, 2011, the disclosure of which is hereby incorporated by reference in its entirety.

BACKGROUND

1. Technical Field

The present disclosure herein relates to hybrid compositions containing organic material and inorganic material, hybrid dielectric layers including the same, and methods of forming the same.

2. Description of Related Art

Recently, wide display apparatuses have been increasingly demanded by customers' need. In order to meet the above requirements, new materials which are capable of being used in fabrication of large display apparatuses have been actively developed.

Organic insulation materials, which is capable of forming a thin film using an atmosphere pressure wet process (e.g., a print coating process, a spin coating process or a bar coating process), have been developed to fabricate the large display apparatuses. The organic insulation materials may have an advantage which is capable of reducing fabrication cost because an organic insulation layer can be formed on a plastic substrate using the organic insulation material. The materials used in the atmosphere pressure wet process should have a low electrical conductivity and a high breakdown voltage. Recently, organic polymer materials, for example, a polyimide material, a polyvinyl alcohol material, a poly(vinylphenol-maleimide) material or a photoacrylic material have been widely used in the atmosphere pressure wet process. However, the organic polymer materials have a lower electrical resistivity than the conventional inorganic materials used in the atmosphere pressure wet process. Thus, there may be some difficulties in replacing the inorganic materials with the organic polymer materials.

Accordingly, hybrid materials having a process facility of the organic polymer materials as wells as an excellent insulating property of the inorganic materials may be demanded to fabricate the large display apparatuses. The hybrid materials, for example, hybrid compositions may be formed by mixing the organic polymer material and the inorganic material. However, after the organic polymer material and the inorganic material are mixed together, the inorganic material may be easily precipitated to cause phase separation of the hybrid composition. As a result, the hybrid composition may still exhibit poor properties, for example, a low electrical resistivity.

Therefore, hybrid compositions having excellent properties may be still required.

SUMMARY

Exemplary embodiments are directed to hybrid compositions containing organic material and inorganic material, hybrid dielectric layers including the same, and methods of forming the same.

In an example embodiment, the hybrid composition includes poly-4-vinylphenol, sodium compound and aluminum compound. A content of the poly-4-vinylphenol to a total weight of the poly-4-vinylphenol, the sodium compound and the aluminum compound is about 69 wt % to about 99.89 wt %. A content of the sodium compound to a total weight of the poly-4-vinylphenol, the sodium compound and the aluminum compound is about 0.01 wt % to about 1 wt %. A content of the aluminum compound to a total weight of the poly-4-vinylphenol, the sodium compound and the aluminum compound is about 0.1 wt % to about 30 wt %.

The sodium compound may include at least one of sodium acetate, sodium sulfate, sodium amide, sodium benzoate, sodium bicarbonate, sodium bisulfate, sodium carbonate and hydrates thereof.

The aluminum compound may include at least one of aluminum acetate, aluminum acetyl acetonate, aluminum bromide, aluminum chloride, aluminum fluoride, aluminum iodide, aluminum nitrate, aluminum sulfate and hydrates thereof.

The hybrid composition may further include a first solvent dissolving the poly-4-vinylphenol. A content of the first solvent may be within the range of about 50 wt % to about 95 wt % in an organic composition including the first solvent and the poly-4-vinylphenol. The first solvent may include at least one of 1-butanol, 2-butanol, 1-propanol, isopropanol, ethanol, methanol, alcohol compound, propylene glycol monomethyl ether acetate, methyl acetate, ethyl acetate and acetate compound.

The hybrid composition may further include a cross linking agent accelerating a cross-linking reaction of the poly-4-vinylphenol. A content of the cross linking agent may be within the range of about 10 wt % to about 30 wt % in an organic composition including the poly-4-vinylphenol and the cross-linking agent. The cross-linking agent may be poly (melamine-co-formaldehyde).

The hybrid composition may further include a second solvent dissolving the sodium compound and the aluminum compound. A content of the second solvent may be substantially equal to or substantially greater than about 70 wt % in an inorganic composition including the second solvent, the sodium compound and the aluminum compound. The second solvent may include at least one of 1-butanol, 2-butanol, 1-propanol, isopropanol, ethanol, methanol, 2-methoxy ethanol, alcohol compound, propylene glycol monomethyl ether acetate, methyl acetate, ethyl acetate, acetate compound, glycol compound and water.

In another example embodiment, the hybrid insulation layer includes poly-4-vinyl phenol of about 69 wt % to about 99.89 wt %, sodium compound of about 0.01 wt % to about 1 wt %, and aluminum compound of about 0.1 wt % to about 30 wt %.

In still another exemplary embodiment, the method includes forming an organic composition, forming an inorganic composition, mixing the organic composition and the inorganic composition to form a hybrid composition, coating the hybrid composition on a substrate, and curing the coated hybrid composition to form a hybrid insulation layer. The organic composition includes a poly-4-vinyl phenol, and the inorganic composition includes a sodium compound and an aluminum compound.

The organic composition and the inorganic composition may be mixed together in a volume ratio of 100:1 to 100:50, respectively.

Forming the organic composition may include dissolving the poly-4-vinylphenol in a first solvent. A content of the first solvent may be within the range of 50 wt % to 95 wt % in the organic composition. Forming the organic composition may further include adding a cross-linking agent accelerating a cross-linking reaction of the poly-4-vinylphenol into the first solvent. A content of the cross-linking agent may be within the range of about 10 wt % to about 30 wt % in the organic composition. Forming the inorganic composition may include dissolving the sodium compound and the aluminum compound in a second solvent. A content of the second solvent may be equal to or greater than 70 wt % in the inorganic composition. The first and second solvents may be evaporated and the cross-linking agent may accelerate a cross-linking reaction of the poly-4-vinylphenol, while the coated hybrid composition is cured. Curing the coated hybrid composition may be performed at a temperature of about 100° C. to about 250° C.

Coating the hybrid composition may be performed using a spin method, a dipping method, a printing method or a spray method.

BRIEF DESCRIPTION OF THE DRAWINGS

The above and other features and advantages of the disclosure will become more apparent in view of the attached drawings and accompanying detailed description.

DETAILED DESCRIPTION OF THE EMBODIMENTS

Figure 1:
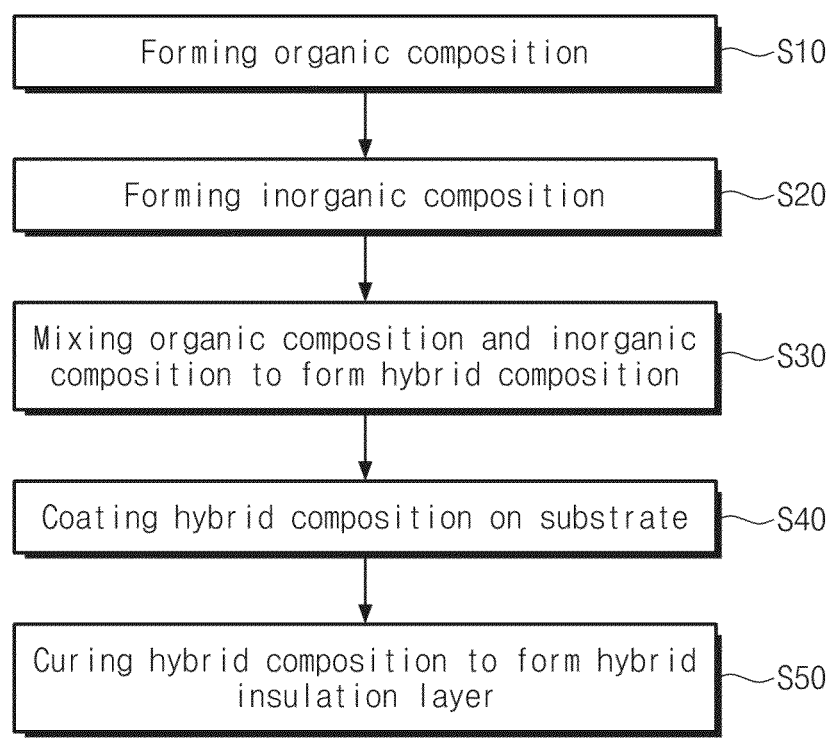
FIG. 1 is process flow chart illustrating a method of forming a hybrid insulation layer according to an exemplary embodiment.

Exemplary embodiments are described below with reference to the accompanying drawings. Many different forms and embodiments are possible without deviating from the spirit and teachings of this disclosure and so the disclosure should not be construed as limited to the exemplary embodiments set forth herein. Rather, these exemplary embodiments are provided so that this disclosure will be thorough and complete, and will convey the scope of the disclosure to those skilled in the art. In the drawings, the sizes and relative sizes of layers and regions may be exaggerated for clarity. Like reference numbers refer to like elements throughout.

It will be understood that, although the terms first, second, etc. may be used herein to describe various elements, these elements should not be limited by these terms. These terms are only used to distinguish one element from another. Thus, a first element could be termed a second element without departing from the teachings of the present embodiments.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein the term "and/or" includes any and all combinations of one or more of the associated listed items.

Now, exemplary embodiments will be described more fully hereinafter with reference to the accompanying drawings.

FIG. 1 is process flow chart illustrating a method of forming a hybrid insulation layer according to an exemplary embodiment.

Referring to FIG. 1, a method of a hybrid insulation layer according to an exemplary embodiment may include a step of forming an organic composition (S10), a step of forming an inorganic composition (S20), a step of mixing the organic composition with the inorganic composition to form a hybrid composition (S30), a step of coating the hybrid composition on a substrate (S40), and a step of curing the coated hybrid composition to form a hybrid insulation layer (S50). The organic composition may include poly-4-vinylphenol, and the inorganic composition may include a sodium compound and an aluminum compound.

The step of forming the organic composition (S10) may include dissolving the poly-4-vinylphenol in a first solvent. The content of the first solvent may be within the range of about 50 wt % to about 95 wt % in the organic composition. The first solvent may include at least one of 1-butanol, 2-butanol, 1-propanol, isopropanol, ethanol, methanol, alcohol compound, propylene glycol monomethyl ether acetate, methyl acetate, ethyl acetate and acetate compound. The organic composition may be formed to further include a cross linking agent. The content of the cross linking agent may be within the range of about 10 wt % to about 30 wt % in the organic composition. The cross linking agent may be, for example, poly(melamine-co-formaldehyde).

The step of forming the inorganic composition (S20) may include dissolving the sodium compound and the aluminum compound in a second solvent. The content of the second solvent may be equal to or greater than about 70 wt % in the inorganic composition. The second solvent may include at least one of 1-butanol, 2-butanol, 1-propanol, isopropanol, ethanol, methanol, 2-methoxy ethanol, alcohol compound, propylene glycol monomethyl ether acetate, methyl acetate, ethyl acetate, acetate compound, glycol compound and water. The sodium compound may include at least one of sodium acetate, sodium sulfate, sodium amide, sodium benzoate, sodium bicarbonate, sodium bisulfate, sodium carbonate and hydrates thereof. The aluminum compound may include at least one of aluminum acetate, aluminum acetyl acetonate, aluminum bromide, aluminum chloride, aluminum fluoride, aluminum iodide, aluminum nitrate, aluminum sulfate and hydrates thereof.

In the step of forming the hybrid composition (S30), the organic composition and the inorganic composition may be mixed together in a volume ratio of 100:1 to 100:50, respectively. The first solvent may have a property that dissolves organic materials, and the second solvent may have a property that dissolves inorganic materials. Further, the organic composition and the inorganic composition may be mixed in an appropriate volume ratio. Thus, the hybrid composition according to the present exemplary embodiment may have a uniform composition ratio without any phase separations. That is, the poly-4-vinylphenol (as the organic material) and the sodium compound and the aluminum compound (as the inorganic materials) may be uniformly distributed in the hybrid composition. If the mixing ratio of the organic composition and the inorganic composition is out of a specific range, the phase separation may occur in the hybrid composition.

The content of the poly-4-vinylphenol may be within the range of about 69 wt % to about 99.89 wt % in a mixture of the poly-4-vinylphenol, the sodium compound and the aluminum compound, and the content of the sodium compound may be within the range of about 0.01 wt % to about 1 wt % in the mixture of the poly-4-vinylphenol, the sodium compound and the aluminum compound. Further, the content of the aluminum compound may be within the range of about 0.1 wt % to 3 about 0 wt % in the mixture of the poly-4-vinylphenol, the sodium compound and the aluminum compound.

Figure 2:
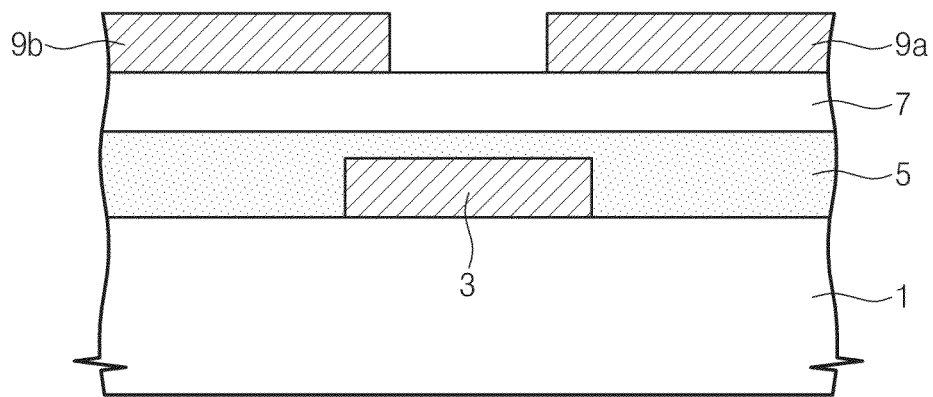
FIG. 2 is a cross sectional view illustrating an organic thin film transistor including a hybrid insulation layer according to an exemplary embodiment.

FIG. 2 is a cross sectional view illustrating an organic thin film transistor including a hybrid insulation layer according to an exemplary embodiment.

Referring to FIGS. 1 and 2, after the step of forming the hybrid composition (S30), the hybrid composition may be coated on a substrate 1 (S40). A gate electrode 3 may be formed on the substrate 1 before the hybrid composition is coated. The hybrid composition may be coated to cover the gate electrode 3. The step of coating the hybrid composition on the substrate 1 (S40) may be performed using a spin method, a dipping method, a printing method or a spray method. The hybrid composition on the substrate 1 may be cured to form a hybrid insulation layer 5 (S50). The step of curing the hybrid composition (S50) may be performed at a temperature of about 100° C. to about 250° C. While the coated hybrid composition is cured, the first and second solvents may be evaporated and the cross linking agent may accelerate a cross-linking reaction of the poly-4-vinylphenol molecules. As a result of the curing process, the hybrid insulation layer 5 may be formed such that the inorganic materials (e.g., the sodium compound and the aluminum compound) are uniformly distributed in the cross-linked organic material (e.g., the cross-linked poly-4-vinylphenol). Since the solvents are all evaporated while the coated hybrid composition is cured, the hybrid insulation layer 5 may include the poly-4-vinylphenol of about 69 wt % to about 99.89 wt %, the sodium compound of about 0.01 wt % to about 1 wt %, and the aluminum compound of about 0.1 wt % to about 30 wt %.

Referring again to FIG. 2, after formation of the hybrid insulation layer 5, a semiconductor layer 7, a source electrode 9a and a drain electrode 9b may be formed on the hybrid insulation layer 5 to complete an organic thin film transistor.

Examples

An organic composition was fabricated by dissolving poly-4-vinylphenol of 1 gram as a solute and poly(melamine-co-formaldehyde) of 1.25 grams as the cross-linking agent in propylene glycol monomethyl ether acetate of 5 grams as the first solvent. An inorganic composition was fabricated by dissolving aluminum nitrate nonahydrate of 0.82 grams and sodium bisulfate of 0.02 grams as solutes in the 2-methoxy ethanol of 50 milliliters as the second solvent.

In a first example, a hybrid composition was fabricated by mixing the organic composition and the inorganic composition in a volume ratio of 9.5:0.5, respectively. The hybrid composition was coated on a substrate rotating at a spin speed of 2000 revolutions per minute (RPM) for 30 seconds, and the coated hybrid composition was cured at a temperature of 200° C. for 10 minutes to form a hybrid insulation layer.

In a second example, a hybrid composition was fabricated by mixing the organic composition and the inorganic composition in a volume ratio of 9:1, respectively. The hybrid composition was coated using the same manner as the first example, and the coated hybrid composition was cured using the same manner as the first example to form a hybrid insulation layer.

In a third example, a hybrid composition was fabricated by mixing the organic composition and the inorganic composition in a volume ratio of 8:2, respectively. The hybrid composition was coated using the same manner as the first example, and the coated hybrid composition was cured using the same manner as the first example to form a hybrid insulation layer.

In a fourth example, a hybrid composition was fabricated by mixing the organic composition and the inorganic composition in a volume ratio of 7:3, respectively. The hybrid composition was coated using the same manner as the first example, and the coated hybrid composition was cured using the same manner as the first example to form a hybrid insulation layer.

In a fifth example, a hybrid composition was fabricated by mixing the organic composition and the inorganic composition in a volume ratio of 5:5, respectively. The hybrid composition was coated using the same manner as the first example, and the coated hybrid composition was cured using the same manner as the first example to form a hybrid insulation layer.

Comparative Example

An organic composition was fabricated by dissolving the poly-4-vinylphenol of 1 gram as a solute and poly(melamine-co-formaldehyde) of 1.25 grams as the cross-linking agent in propylene glycol monomethyl ether acetate of 5 grams as the first solvent. The organic composition was coated on a substrate rotating at a spin speed of 2000 revolutions per minute (RPM) for 30 seconds, and the coated organic composition was cured at a temperature of 200° C. for 10 minutes to form an organic insulation layer.

Dielectric constants of the hybrid insulation layers and the organic insulation layer fabricated according to the first to fifth examples and the comparative example are summarized in the following table 1.

TABLE 1

| | Comparative example | Example 1 | Example 2 | Example 3 | Example 4 | Example 5 |
|---|---|---|---|---|---|---|
| Volume ratio (Organic composition:Inorganic composition) | 100:0 | 95:5 | 90:10 | 80:20 | 70:30 | 50:50 |
| Dielectric Constant | 2.7 | 4.05 | 4.19 | 4.41 | 3.99 | 3.38 |

As can be seen from the table 1, the organic insulation layer (without any inorganic materials) fabricated according to the comparative example exhibited a relatively low dielectric constant of 2.7. In contrast, the hybrid insulation layers fabricated according to the first to fifth examples exhibited relatively high dielectric constants as compared with the comparative example. In addition, the dielectric constants of the hybrid insulation layers fabricated by first to fifth examples were different from each other according to the volume ratio of the organic composition and the inorganic composition. Thus, the hybrid insulation layer having a desired dielectric constant can be formed by adjusting the volume ratio of the organic composition and the inorganic composition.

Figure 3A:
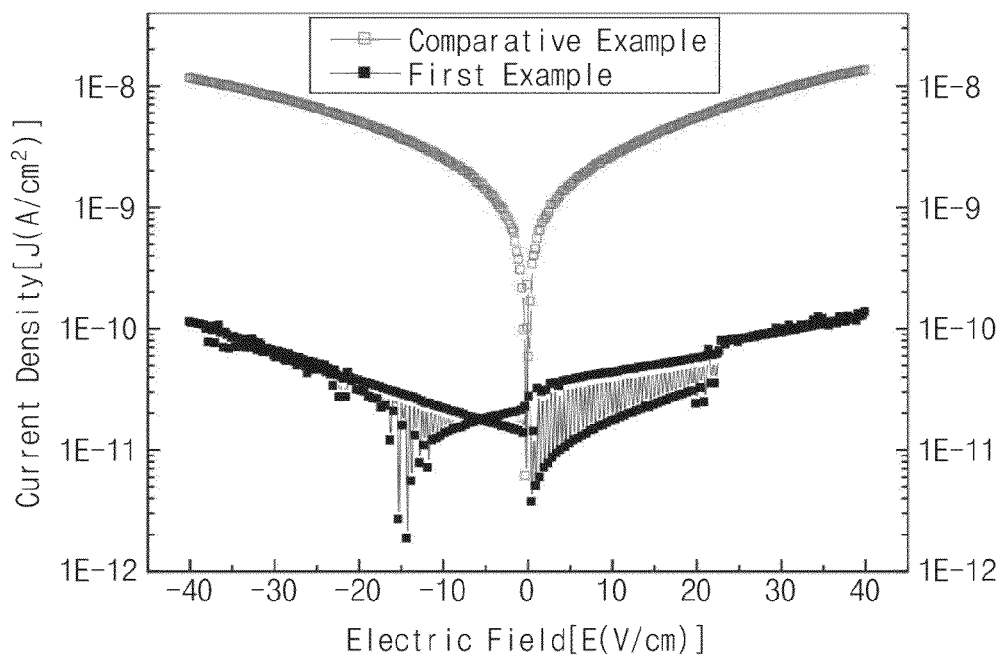
FIG. 3A is a graph showing a relationship of current density and electric field of hybrid insulation layers according to an exemplary embodiment and a comparative example.
Figure 3B:
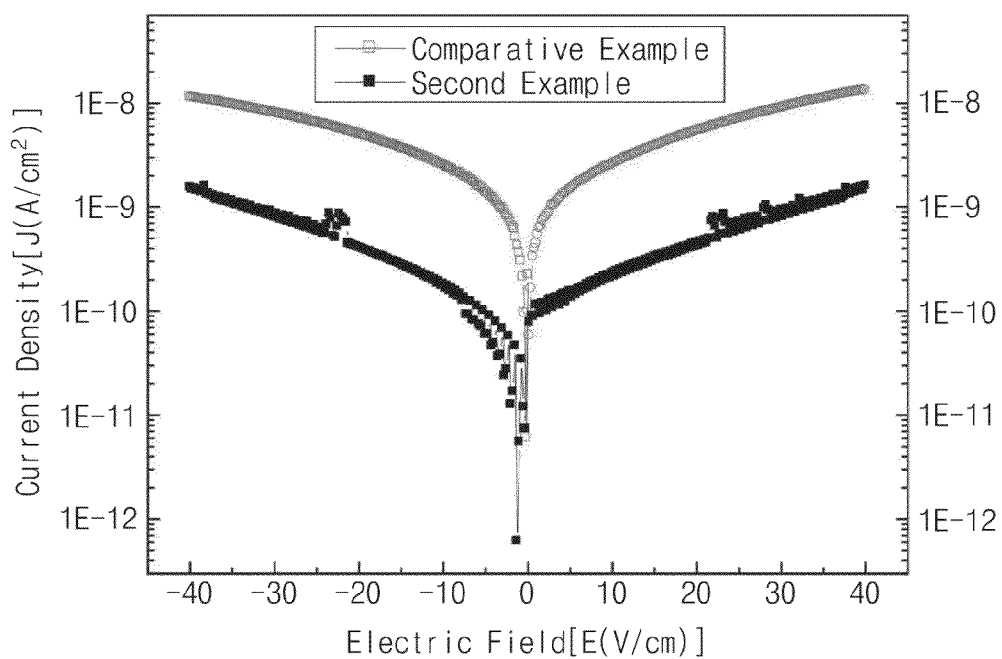
FIG. 3B is a graph showing a relationship of current density and electric field of hybrid insulation layers according to another exemplary embodiment and a comparative example.

Voltage signals were applied to the insulation layers fabricated by the first example, the second example and the comparative example in order to measure leakage currents that flow through the insulation layers and in order to evaluate the insulating properties thereof. FIG. 3A is a graph showing a relationship of current density and electric field of hybrid insulation layers fabricated according to the first example and the comparative example, and FIG. 3B is a graph showing a relationship of current density and electric field of hybrid insulation layers fabricated according to the second example and the comparative example. In the graphs of FIGS. 3A and 3B, the abscissas denote a electric field E, and the ordinates denote a current density J.

Referring to FIGS. 3A and 3B, the current densities J of the hybrid insulation layers fabricated by the first and second examples were remarkably reduced as compared with the current density J of the organic insulation layer fabricated by the comparative example. As can be seen from FIG. 3A, the hybrid insulation layer fabricated by the first example exhibited the leakage current density J of about $1\times10^{-10}$ A/cm$^2$ at an electric field E of about 40 V/cm, and the organic insulation layer fabricated by the comparative example exhibited the leakage current density J of about $1\times10^{-8}$ A/cm$^2$ at an electric field E of about 40 V/cm. That is, the hybrid insulation layer fabricated by the first example was improved by about two orders in the leakage current characteristic as compared with the organic insulation layer fabricated by the comparative example. According to FIG. 3B, the hybrid insulation layer fabricated by the second example exhibited the leakage current density J of about $1\times10^{-9}$ A/cm$^2$ at an electric field E of about 40 V/cm, and the organic insulation layer fabricated by the comparative example exhibited the leakage current density J of about $1\times10^{-8}$ A/cm$^2$ at an electric field E of about 40 V/cm. That is, the hybrid insulation layer fabricated by the second example was improved by about one order in the leakage current characteristic as compared with the organic insulation layer fabricated by the comparative example.

Figure 4A:
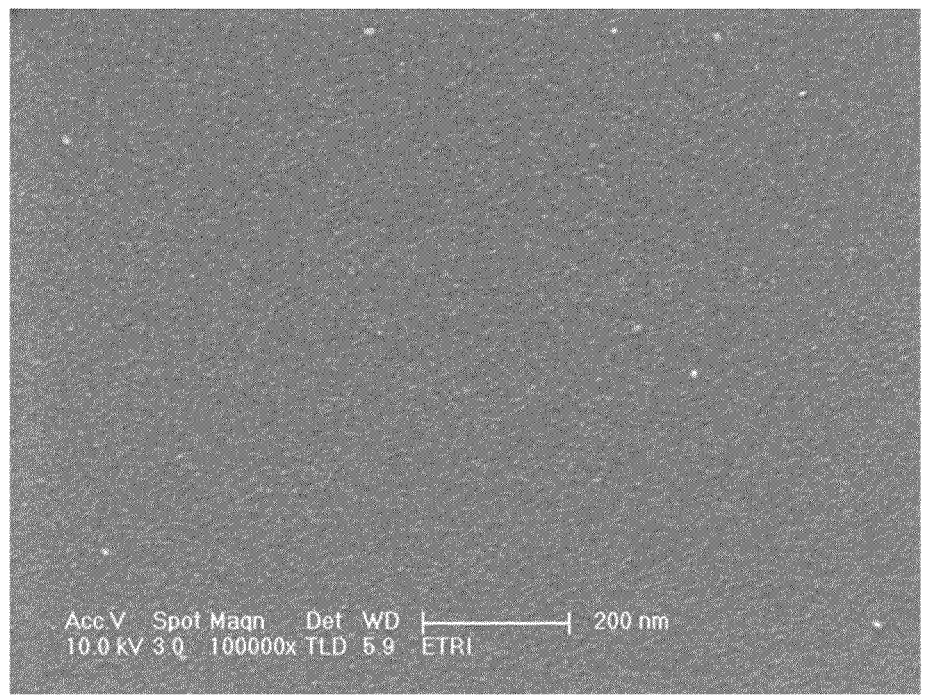
FIG. 4A is a scanning electron microscope (SEM) picture showing a surface of a hybrid insulation layer fabricated according to an exemplary embodiment.
Figure 4B:
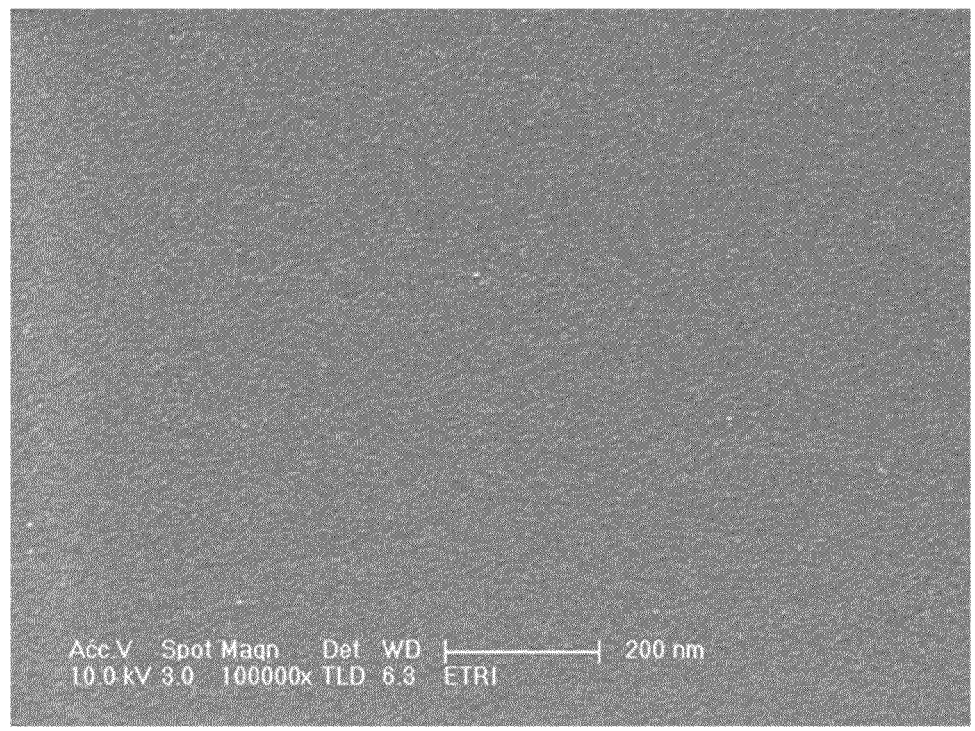
FIG. 4B is a scanning electron microscope (SEM) picture showing a surface of a hybrid insulation layer fabricated according to another exemplary embodiment.

Surface states of the insulation layers fabricated by the first example and the second example were taken using a scanning electron microscope (SEM). FIG. 4A is a scanning electron microscope (SEM) picture showing a surface of the hybrid insulation layer fabricated according to the first example, and FIG. 4B is a scanning electron microscope (SEM) picture showing a surface of the hybrid insulation layer fabricated according to the second example. Referring to FIGS. 4A and 4B, it can be understood that the hybrid insulation layers were uniformly formed to have an excellent flatness without any cracks.

Figure 5A:
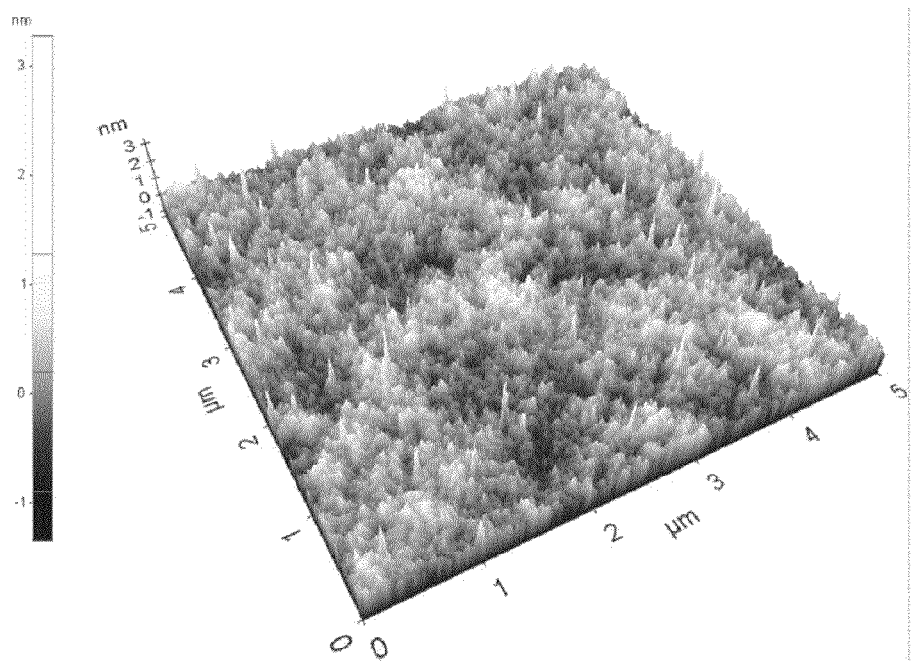
FIG. 5A is an atomic force microscope (AFM) picture showing a surface of a hybrid insulation layer fabricated according to an exemplary embodiment.
Figure 5B:
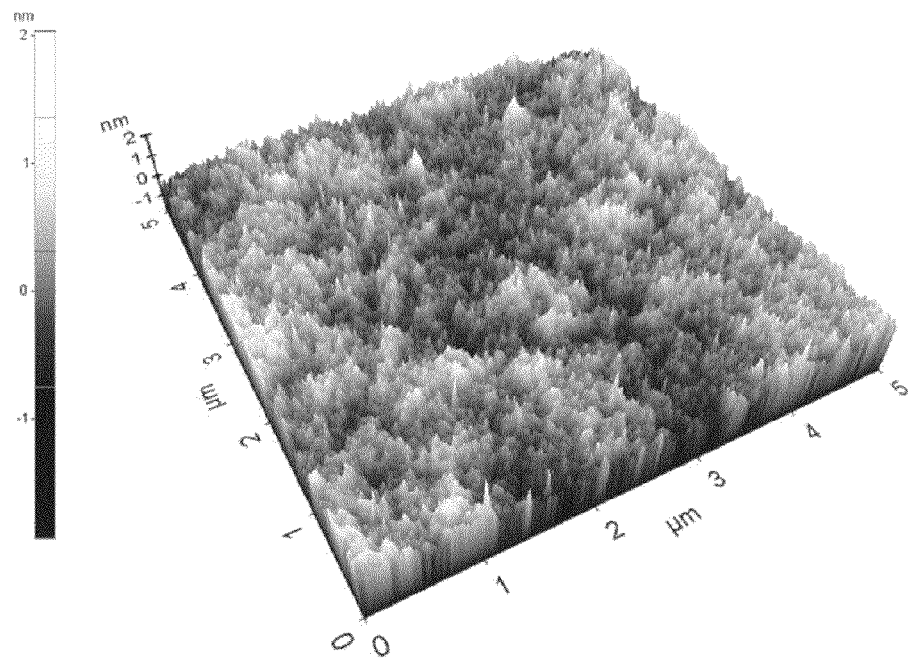
FIG. 5B is an atomic force microscope (AFM) picture showing a surface of a hybrid insulation layer fabricated according to another exemplary embodiment.

Surface states of the insulation layers fabricated by the first example and the second example were taken using an atomic force microscope (AFM) to evaluate surface roughness thereof. FIG. 5A is an atomic force microscope (AFM) picture showing a surface of the hybrid insulation layer fabricated according to the first example, and FIG. 5B is an atomic force microscope (AFM) picture showing a surface of the hybrid insulation layer fabricated according to the second example. Referring to FIGS. 5A and 5B, the average surface roughness of the hybrid insulation layer fabricated according to the first example was 0.249 nm, and the average surface roughness of the hybrid insulation layer fabricated according to the second example was 0.258 nm. That is, it can be understood that the hybrid insulation layers were uniformly formed to have excellent surface roughness.

According to the embodiments set forth above, a hybrid insulation composition includes both a first solvent having an excellent solubility of an organic solute (e.g., an organic material) and a second solvent having an excellent solubility of an inorganic solute (e.g., an inorganic material). Further, an organic composition including the first solvent and the organic solute can be mixed with an inorganic composition including the second solvent and the inorganic solute, thereby forming a hybrid composition. The hybrid composition may be cured to form a hybrid insulation layer. Accordingly, the hybrid insulation layer can be formed such that the inorganic solute and the organic solute are uniformly distributed in the hybrid insulation layer without any phase separation.

In addition, the hybrid insulation layer can be uniformly formed to include the inorganic solute having a high dielectric constant. Thus, the hybrid insulation layer can be formed to have a desired dielectric constant by adjusting the volume ratio of the organic solute and the inorganic solute.

Moreover, the method of fabricating the hybrid insulation layer according to the exemplary embodiments can be formed using a high polymer material. Thus, the hybrid insulation layer can be uniformly formed on a substrate having a large diameter using a low cost wet process.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A hybrid composition, comprising:
   poly-4-vinylphenol;
   a sodium compound;
   an aluminum compound; and
   a cross-linking agent effective to accelerate a cross-linking reaction of the ploy-4-vinylphenol,
   wherein, based on total weight of the poly-4-vinylphenol, the sodium compound and the aluminum compound, content of the poly-4-vinylphenol is 69 wt % to 99.89 wt %, content of the sodium compound is 0.01 wt % to 1 wt %, and content of the aluminum compound is 0.1 wt % to 30 wt %, and
   wherein content of the cross-linking agent ranges from 10 wt % to 30 wt % in an organic composition including the poly-4-vinylphenol and the cross-linking agent.

2. The hybrid composition of claim 1, wherein the sodium compound comprises at least one of sodium acetate, sodium sulfate, sodium amide, sodium benzoate, sodium bicarbonate, sodium bisulfate, sodium carbonate and hydrates thereof.

3. The hybrid composition of claim 1, wherein the aluminum compound comprises at least one of aluminum acetate, aluminum acetyl acetonate, aluminum bromide, aluminum chloride, aluminum fluoride, aluminum iodide, aluminum nitrate, aluminum sulfate and hydrates thereof.

4. The hybrid composition of claim 1, further comprising a first solvent in which the poly-4-vinylphenol is dissolved, wherein content of the first solvent ranges from 50 wt % to 95 wt % in an organic composition including the first solvent and the poly-4-vinylphenol.

5. The hybrid composition of claim 4, wherein the first solvent comprises at least one of 1-butanol, 2-butanol, 1-propanol, isopropanol, ethanol, methanol, alcohol compound, propylene glycol monomethyl ether acetate, methyl acetate, ethyl acetate and acetate compound.

6. The hybrid composition of claim 1, wherein the cross-linking agent is poly(melamine-co-formaldehyde).

7. The hybrid composition of claim 4, further comprising a second solvent in which the sodium compound and the aluminum compound are dissolved, wherein content of the second solvent is equal to or greater than 70 wt % in an inorganic composition including the second solvent, the sodium compound and the aluminum compound.

8. The hybrid composition of claim 7, wherein the second solvent comprises at least one of 1-butanol, 2-butanol, 1-propanol, isopropanol, ethanol, methanol, 2-methoxy ethanol, alcohol compound, propylene glycol monomethyl ether acetate, methyl acetate, ethyl acetate, acetate compound, glycol compound and water.

9. A hybrid insulation layer, comprising:
   from 69 wt % to 99.89 wt % of poly-4-vinyl phenol including a cross-linking agent;
   from of 0.01 wt % to 1 wt % of a sodium compound; and
   from of 0.1 wt % to 30 wt % of an aluminum compound,
   wherein accelerating cross-linking reacts the poly-4-vinylphenol, and
   wherein content of the cross-linking agent ranges from 10 wt % to 30 wt % in an organic composition including the poly-4-vinylphenol and the cross-linking agent.

10. A hybrid insulation layer that is dielectric and includes cross-linked poly-4-vinyl phenol, comprising:
    the composition according to claim 1 wherein the poly-4-vinyl phenol is cross-linked.

* * * * *